United States Patent
Yang

(10) Patent No.: US 11,595,867 B2
(45) Date of Patent: Feb. 28, 2023

(54) ADDRESS COORDINATION METHOD, DEVICE, BASE STATION, SMF NETWORK ELEMENT AND STORAGE MEDIUM

(71) Applicant: ZTE CORPORATION, Guangdong (CN)

(72) Inventor: Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/017,539

(22) Filed: Sep. 10, 2020

(65) Prior Publication Data

US 2021/0092656 A1   Mar. 25, 2021

Related U.S. Application Data

(63) Continuation of application No. PCT/CN2018/124177, filed on Dec. 27, 2018.

(30) Foreign Application Priority Data

Mar. 14, 2018  (CN) .......................... 201810210168.3

(51) Int. Cl.
*H04W 36/02*   (2009.01)
*H04W 36/00*   (2009.01)
*H04W 36/08*   (2009.01)

(52) U.S. Cl.
CPC ...... *H04W 36/023* (2013.01); *H04W 36/0011* (2013.01); *H04W 36/08* (2013.01)

(58) Field of Classification Search
CPC .......... H04W 36/023; H04W 36/0011; H04W 36/08; H04W 36/0069; H04W 36/06;
(Continued)

(56) References Cited

U.S. PATENT DOCUMENTS

2017/0181044 A1*  6/2017  Wen ..................... H04W 76/19
2017/0188285 A1*  6/2017  Moon ................... H04L 5/0035
2017/0339609 A1   11/2017 Youn et al.

FOREIGN PATENT DOCUMENTS

CN     106211244 A    12/2016
CN     106658719 A     5/2017
(Continued)

OTHER PUBLICATIONS

Ericsson ("Establishing a second NG-U tunnel fora PDU session", 3GPP TSG-RAN WG3 Meeting #99, R3-181264, Feb. 26-Mar. 2, 2018) (Year: 2018).*
(Continued)

*Primary Examiner* — Chi H Pham
*Assistant Examiner* — Ji-Hae Yea
(74) *Attorney, Agent, or Firm* — Foley & Lardner LLP

(57) ABSTRACT

Provided are an address coordination method and device, a base station, a session management function (SMF) network element and a storage medium. In a handover process of a terminal from a source base station side to a target base station side, a UPF split state of a PDU session of the terminal may be determined and data transmission tunnel address coordination may be implemented, thereby enhancing flexibility of split control of the PDU session in the handover process of the terminal, preventing the target base station side from executing PDU session resource modify/modification indication and other processes again to perform the data transmission tunnel address coordination after the terminal completes the handover. Resource admission control efficiency of the target base station side can be improved, so that the PDU session enters a reasonable state of UPF split or UPF non-split, and signaling resources can be saved.

10 Claims, 7 Drawing Sheets

(58) Field of Classification Search
CPC ...... H04W 76/12; H04L 29/08; H04L 5/0053; H04L 67/14

See application file for complete search history.

(56) References Cited

FOREIGN PATENT DOCUMENTS

| CN | 106937271 A | 7/2017 |
|---|---|---|
| CN | 106941733 A | 7/2017 |
| CN | 107734571 A | 2/2018 |
| WO | WO-2018/029931 A1 | 2/2018 |

OTHER PUBLICATIONS

Ericsson ("PDU Session Split at UPF", 3GPP TSG-RAN WG3 Meeting #99, R3-181266, Feb. 26-Mar. 2, 2018) (Year: 2018).*

Ericsson:"PDU Session Split at UPF" 3GPP TSG-RAN WG3 Meeting# AH-1801. R3-180408, Jan. 12, 2018 (Jan. 12, 2018)(10 Pages).

Huawei: "TS 23.502: Handling PDU sessions rejected by RAN during handover" SA WG2 Meeting #121, S2-173138, May 9, 2017 (May 9, 2017), (10 Pages).

International Search Report and Written Opinion for PCT Appl. No. PCT/CN2018/124177 dated Mar. 15, 2019 (with English translation, 9 pages).

First Office Action for CN Appl. No. 201810210168.3, dated May 6, 2021 (5 pages).

3rd Generation Partnership Project, "BG-RAN; NG Application Protocol (NGAP) (Release 15)" Technical Specification Group Radio Access Network, 3GPP TS 38.413, V0.7.0, Mar. 2018 (121 pages).

3rd Generation Partnership Project, "Evolved Universal Terrestrial Radio Access (E-UTRA) and NR; Multi-Connectivity; Stage 2 (Release 15)" Technical Specification Group Radio Access Network, 3GPP TS 37.340, V15.0.0, Dec. 2017 (51 pages).

Extended European Search Report for EP Appl. No. 18909768.6, dated Feb. 4, 2022 (11 pages).

Ericsson, "Establishing a second NG-U tunnel for a PDU Session" 3GPP TSG-RAN WG3 Meeting #99, R3-181264, Mar. 2, 2018, Athens, Greece (16 pages).

Ericsson, "PDU Session Split at UPF" 3GPP TSG-RAN WG3 Meeting #99, R3-181266, Mar. 2, 2018, Athens, Greece (3 pages).

First Office Action for JP Appl. No. 2020-548787, dated Nov. 11, 2022 (with English translation, 8 pages).

ZTE, "Further Discussion on Tunnel Building in PDU Session Split@UPF Case" 3GPP TSG RAN WG3#1801 ad-hoc, R3-180009, Jan. 26, 2018, Sophia-Antipolice, France (2 pages).

ZTE, "Summary of email discussion [99#49] on MN/SN procedures" 3GPP TSG-RAN WG2 #99bis, R2-1711527, Oct. 13, 2017, Prague, Czech Republic (18 pages).

ZTE, "TP to capture agreements from R2-1711527" 3GPP TSG-RAN WG2 #99bis, R2-1711942, Oct. 13, 2017, Prague, Czech Republic (8 pages).

* cited by examiner

ADDRESS COORDINATION METHOD, DEVICE, BASE STATION, SMF NETWORK ELEMENT AND STORAGE MEDIUM

CROSS-REFERENCE TO RELATED APPLICATIONS

This application claims the benefit of priority under 35 U.S.C. § 120 as a continuation of PCT Patent Application No. PCT/CN2018/124177, filed on Dec. 27, 2018, which claims priority to Chinese patent application no. 201810210168.3, filed on Mar. 14, 2018, the disclosure of each of which is incorporated herein by reference in its entirety.

TECHNICAL FIELD

The present disclosure relates to the field of communications and, in particular, to an address coordination method and device, a base station, an SMF network element and a storage medium.

BACKGROUND

A 5-th generation (5G) system includes a 5G core network (5GC) and a next generation radio access network (NG-RAN), where the 5GC includes basic network elements such as an access mobility function (AMF), a session management function (SMF) and a user plane function (UPF), and the NG-RAN includes at least two different types of base stations: an Ng-eNB based on the evolution of an eNB and a newly designed gNB (supporting new radio (NR) air interfaces). NG-RAN base stations are connected to the 5GC through an NG interface, and the NG-RAN base stations are connected to each other through an Xn interface.

An NG-RAN system supports single connectivity (SC) and dual/multiple connectivity (DC/MC) operations and functions. In a DC/MC mode, a UE has two or more data transmission channels on an air interface or a network side. Dual connectivity is used as an example, single connectivity is a special case of the dual connectivity when a master node (MN) side is only considered (all secondary links with a secondary node (SN) are deleted), and multiple connectivity is further extension of the dual-connectivity in a multi-link operation dimension.

Under the dual connectivity, the UE may simultaneously establish and maintain two independent radio connections (e.g. air interface data transmission channels) with two NG-RAN base stations through the air interface. One base station is referred to as the master node (MN) and the other base station is referred to as the secondary node (SN). The MN and the SN may simultaneously establish and maintain two independent network-side connections (network data transmission channels) with a UPF network element of a core network through the NG interfaces. One architecture of the dual connectivity is shown in FIG. 1.

In FIG. 1, a dashed line represents a control plane connection between network elements, and a thick solid line represents a user plane connection, that is, a user data transmission channel between network elements. Between the MN/SN and the UPF network element, there are two user plane connections between 5G core network elements, two Next Generation-User Plane (NG-U) interface data transmission channels exist, which are: an NG-U (e.g. MN) data transmission channel between the UPF and the MN and an NG-U (e.g. SN) data transmission channel between the UPF and the SN. The two data transmission channels may be used for transmissions of uplink and downlink data packets carried on a specific protocol data unit (PDU) session/Quality of Service (QoS) data flows.

According to a current protocol, on an NG-U interface, each PDU session configured by the UE corresponds to one GTP tunnel by default, that is, one UPF network element uplink address is paired with a base station downlink address. However, due to the introduction of a UPF split function of the PDU, as shown in FIG. 2, a single PDU session includes QoS flows 1/2/3/4/5, where QoS flows 1/2 are anchored on an MN side, and QoS flows 3/4/5 are anchored on an SN side. The single PDU session may correspond to two independent data transmission tunnels, GTP tunnels on both the MN side and the SN side, that is, one UPF network element uplink address and one MN downlink address+another one UPF network element uplink address and one SN downlink address. For a certain UE, if a certain PDU session configured by the UE is UPF split, in a scenario where the UE is unmoved, the coordination of address pairs between the MN/SN and the UPF may be achieved through an NGAP protocol: PDU session resource setup/modify/modification indication and other processes.

However, in a scenario where the UE moves across base stations, due to resource admission control on a target base station side, when a certain PDU session of the UE is handed over from a source base station side to the target base station side, the PDU session may need to be switched from a UPF non-split state to a UPF split state or from the UPF non-split state to the UPF non-split state. However, a current NGAP protocol cannot support the coordination of a data transmission tunnel address for the PDU session between a target base station and the UPF when the UE moves across base stations. Therefore, at present, when the UE moves across base stations, the PDU session of the UE cannot be simultaneously switched to the UPF split or UPF non-split state. If the PDU session needs to be switched to the UPF split or UPF non-split state, only after the UE completes the handover, can the target base station side execute PDU session resource modify/modification indication or other processes again to coordinate the data transmission tunnel address. This data transmission tunnel address coordination manner not only leads to low efficiency of resource admission control at the target base station side, but also increases overheads of signaling resources between the base station and the core network.

SUMMARY

Embodiments of the present disclosure provide an address coordination method and device, a base station, an SMF network element and a storage medium which mainly solve the technical problem that am existing data transmission tunnel address coordination manner leads to low efficiency of resource admission control on a target base station side and large overheads of signaling resources with a core network.

To solve the above problem, an embodiment of the present disclosure provides a data transmission tunnel address coordination method. The method includes steps described below.

In a handover process of a terminal from a source base station side to a target base station side, a user plane function (UPF) split state of a protocol data unit (PDU) session of the terminal at the target base station side and a target bearer base station for carrying the PDU session at the target base station side are determined.

A base station downlink address allocated to the PDU session by the target bearer base station is acquired.

The base station downlink address is sent to a session management function (SMF) network element in a core network, and a UPF network element uplink address allocated to the target bearer base station is acquired from the SMF network element.

The UPF network element uplink address is sent to the target bearer base station for the target bearer base station to establish a data transmission tunnel with a UPF network element, where the data transmission tunnel is used for transmitting the PDU session.

An embodiment of the present disclosure further provides a data transmission tunnel address coordination method. The method includes steps described below.

A base station downlink address sent by a target base station side is received, where the base station downlink address is acquired by the target base station side from a target bearer base station for carrying a PDU session of a terminal at the target base station side in a handover process of the terminal from a source base station side to the target base station side.

A corresponding UPF network element uplink address is allocated to the target bearer base station to which the base station downlink address belongs.

The UPF network element uplink address is forwarded to the target base station side.

An embodiment of the present disclosure further provides a data transmission tunnel address coordination device. The device includes a split processing module, a downlink address acquisition module, an uplink address acquisition module and a coordination processing module.

The split processing module is configured to: in a handover process of a terminal from a source base station side to a target base station side, determine a user plane function (UPF) split state of a protocol data unit (PDU) session of the terminal at the target base station side, and a target bearer base station for carrying the PDU session at the target base station side.

The downlink address acquisition module is configured to acquire a base station downlink address allocated to the PDU session by the target bearer base station.

The uplink address acquisition module is configured to send the base station downlink address to a session management function (SMF) network element in a core network, and acquire a UPF network element uplink address allocated to the target bearer base station from the SMF network element.

The coordination processing module is configured to send the UPF network element uplink address to the target bearer base station for the target bearer base station to establish a data transmission tunnel with a UPF network element, where the data transmission tunnel is used for transmitting the PDU session.

An embodiment of the present disclosure further provides a data transmission tunnel address coordination device. The device includes a receiving module, a processing module and a sending module.

The receiving module is configured to receive a base station downlink address sent by a target base station side, where the base station downlink address is acquired by the target base station side from a target bearer base station for carrying a PDU session of a terminal at the target base station side in a handover process of the terminal from a source base station side to the target base station side.

The processing module is configured to allocate a UPF network element uplink address to the target bearer base station to which the base station downlink address belongs.

The sending module is configured to forward the UPF network element uplink address to the target base station side.

An embodiment of the present disclosure further provides a base station, including a first processor, a first memory and a first communication bus.

The first communication bus is configured to implement connection and communication between the first processor and the first memory.

The first processor is configured to execute one or more first programs stored in the first memory to implement the steps of the preceding data transmission tunnel address coordination method.

An embodiment of the present disclosure further provides a session management function network element, including a second processor, a second memory and a second communication bus.

The second communication bus is configured to implement connection and communication between the second processor and the second memory.

The second processor is configured to execute one or more second programs stored in the second memory to implement the steps of the preceding data transmission tunnel address coordination method.

An embodiment of the present disclosure further provides a computer-readable storage medium, storing one or more first programs executed by one or more first processors to implement the steps of the preceding data transmission tunnel address coordination method.

Alternatively, the computer-readable storage medium stores one or more second programs executed by one or more second processors to implement the steps of the preceding data transmission tunnel address coordination method.

The present disclosure has the beneficial effects below.

According to the address coordination method and device, the base station, the SMF network element and the storage medium provided by the embodiments of the present disclosure, in the handover process of the terminal from the source base station side to the target base station side, the user plane function (UPF) split state of the protocol data unit (PDU) session of the terminal at the target base station side and the target bearer base station for carrying the PDU session at the target base station side can be determined; the base station downlink address allocated to the PDU session by the target bearer base station is acquired and sent to the SMF network element, and the UPF network element uplink address allocated to the target bearer base station is acquired from the SMF network element for the target bearer base station to establish the data transmission tunnel with the UPF network element. That is, in the embodiments of the present disclosure, in the handover process of the terminal from the source base station side to the target base station side, the UPF split state of the PDU session of the terminal may be determined and data transmission tunnel address coordination may be implemented, thereby enhancing flexibility of split control of the PDU session in the handover process of the terminal, preventing the target base station side from executing PDU session resource modify/modification indication and other processes again to perform the data transmission tunnel address coordination after the terminal completes the handover. Resource admission control efficiency of the target base station side can be improved, so that the PDU session enters a split state to be entered at the target base station side as soon as possible, and signaling resources between the target base station side and the core network can be saved.

Other features of the present disclosure and corresponding beneficial effects are set forth later in the description, and it should be understood that at least part of the beneficial effects become apparent from the description of the present disclosure.

DETAILED DESCRIPTION

To make the objects, solutions and advantages of the present disclosure clearer, the embodiments of the present disclosure will be further described below in detail in conjunction with embodiments and the drawings. It should be understood that the embodiments described herein are intended to explain the present disclosure and not to limit the present disclosure.

Embodiment One

Figure 1:
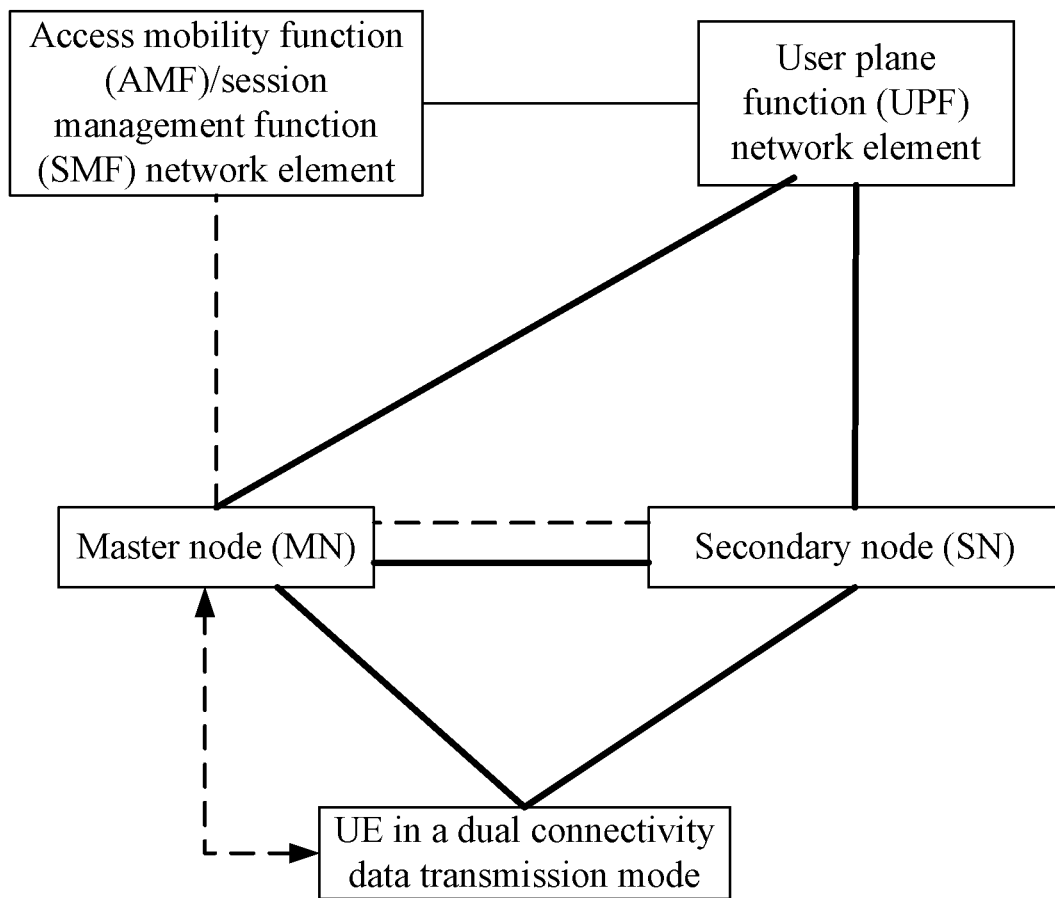
FIG. 1 is an architectural schematic diagram of a dual-connectivity working mode.
Figure 2:
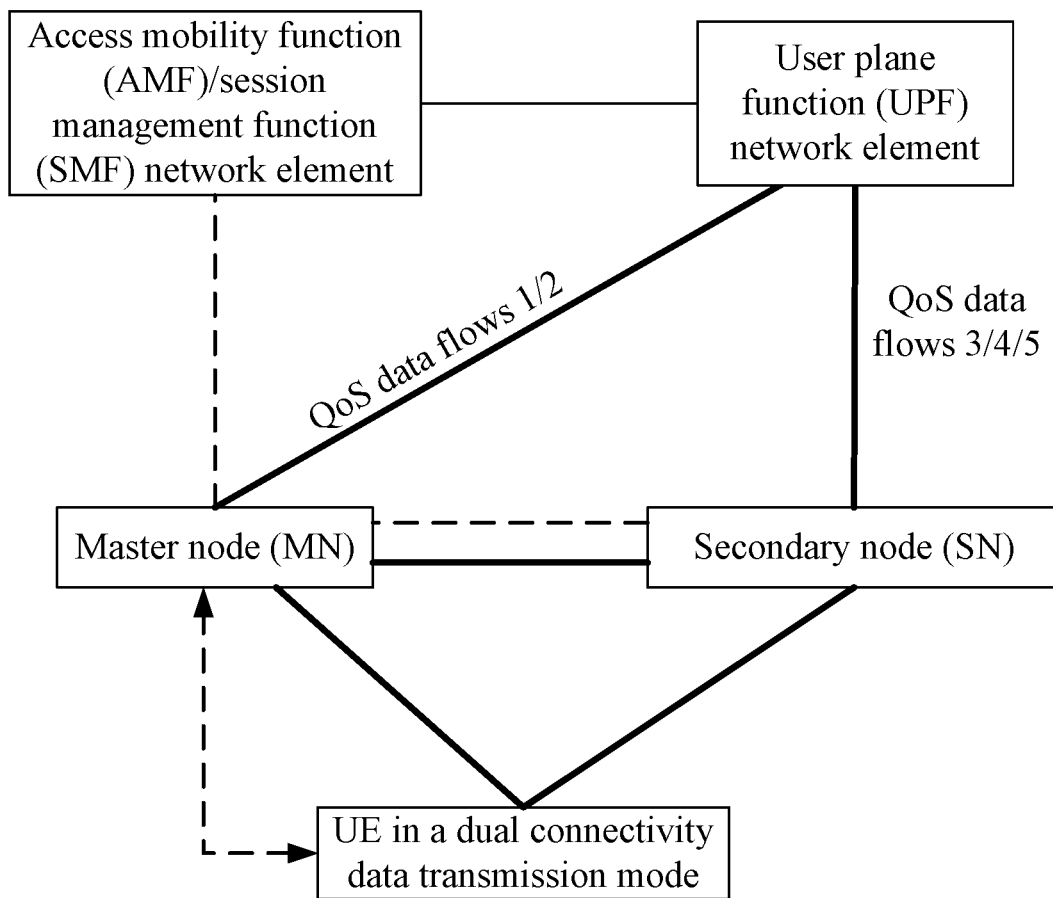
FIG. 2 is schematic diagram illustrating a UPF split function of a PDU session.
Figure 3:
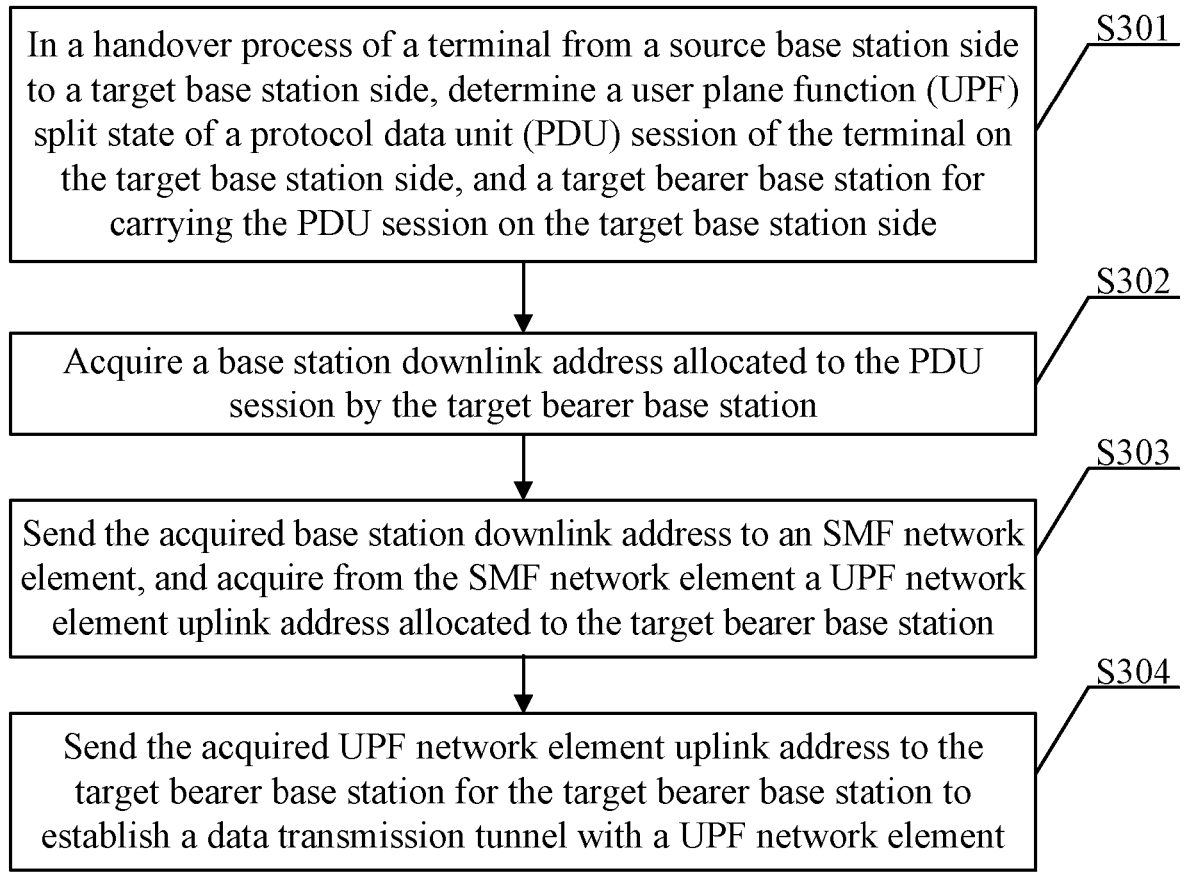
FIG. 3 is a flowchart of a data transmission tunnel address coordination method on a target base station side according to an embodiment one of the present disclosure.

For the problem that an existing terminal cannot simultaneously switch a split state of a PDU session of the terminal in a cross-base station movement process, this embodiment provides a data transmission tunnel address coordination method. As shown in FIG. 3, the method on a target base station side includes steps described below.

In S301, in a handover process of a terminal from a source base station side to a target base station side, a user plane function (UPF) split state of a protocol data unit (PDU) session of the terminal at the target base station side and a target bearer base station for carrying the PDU session at the target base station side are determined.

It should be understood that in this embodiment, the source base station side may include only one base station (this case is referred to as the inclusion of only a source master base station in this embodiment), and the terminal is in a single connectivity state on the source base station side; and the source base station side may also include double base stations or multiple base stations (multiple base stations mean that the number of base stations included is greater than 2) when the source base station side includes the source master base station and at least one source secondary base station, and the terminal is in a dual/multiple connectivity state on the source base station side. Correspondingly, a UPF split state of the PDU session of the terminal on the source base station side may be UPF split (that is, at least two base stations simultaneously carry the PDU session) or UPF non-split (that is, only one base station carries a certain PDU session). For example, when the source base station side includes only the source master base station, and the terminal is in the single connectivity state on the source base station side, the PDU session of the terminal is certainly in the UPF non-split state; when the source base station side includes double base stations or multiple base stations, and the terminal is in the dual/multiple connectivity state at the source base station side, the PDU session of the terminal may be in the UPF non-split state or in the UPF split state.

In this embodiment, the target base station side may include only one base station (this case is referred to as the inclusion of only a target master base station in this embodiment), and the terminal is in the single connectivity state at the target base station side after handed over to the target base station side; and the target base station side may also include double base stations or multiple base stations (multiple base stations mean that the number of base stations included is greater than 2 and a specific number may be flexibly set) when the target base station side includes the target master base station and at least one target secondary base station, and the terminal is in the dual/multiple connectivity state at the target base station side after handed over to the target base station side. Correspondingly, after the terminal is handed over to the target base station side, the UPF split state of its PDU session at the target base station side may also be UPF split or UPF non-split. For example, when the target base station side only includes the target master base station, and the terminal is in the single connectivity state with the target master base station after the handover, the PDU session of the terminal can only be in the UPF non-split state after the handover to the target base station side no matter whether it is in the UPF split or UPF non-split state on the source base station side before the handover (therefore, if it is in the UPF split state on the source base station side before the handover, the PDU session needs to be switched to the UPF non-split state). In another example, when the target base station side includes double base stations or multiple base stations, and the terminal is in the dual/multiple connectivity state after handed over to the target base station side, the PDU session of the terminal may be in the UPF non-split state or the UPF split state, where a specific state may be flexibly determined. If it is determined that the PDU session needs to be in the UPF split state after the handover to the target base station side, and it is in the UPF non-split state on the source base station side before the handover, it needs to be switched to the UPF split state. Correspondingly, if it is determined that it needs to be in the UPF non-split state after the handover to the target base station side, and it is in the UPF split state on the source base station side before the handover, it needs to be switched to the UPF non-split state.

As shown above, in this embodiment, the determined target bearer base station for carrying the PDU session at the target base station side may be one base station (for example, when the UPF split state of the PDU session of the terminal at the target base station side is determined to be UPF split) or two or more base stations (for example, when the UPF split state of the PDU session of the terminal at the target base station side is determined to be UPF non-split), and the determined target bearer base station may include only the target master base station, only the target secondary base station or both the target master base station and the target secondary base station. A specific case may be flexibly determined according to specific situations.

For example, when the UPF split state of the PDU session of the terminal at the target base station side is determined to be UPF split, Quality of Service (QoS) data flows included in the PDU session have to be carried by at least two base stations at the target base station side. In this case, the determined target bearer base stations are base stations to which the QoS data flows of the PDU session are split at the target base station side. Assuming that the PDU session includes QoS data flows 1/2/3/4 and is in the UPF non-split state on the source base station side, the target base station side includes the target master base station, a first target secondary base station, a second target secondary base station, . . . , and an N-th target secondary base station, and the UPF split state of the PDU session at the target base station side is determined to be UPF split, when it is determined that a QoS data flow 1 is carried by the first target secondary base station, and QoS data flows 2/3/4 are carried by the second target secondary base station, the determined target bearer base station includes only the first target secondary base station and the second target secondary base station. When it is determined that the QoS data flow 1 is carried by the target master base station, and the QoS data flows 2/3/4 are carried by the second target secondary base station, the determined target bearer base station includes the target master base station and the second target secondary base station. In this example, when the UPF split state of the PDU session at the target base station side is determined to be UPF non-split, the determined target bearer base station may be any one of the target master base station, the first target secondary base station, the second target secondary base station, . . . , or the N-th target secondary base station. Of course, if the UPF split state of the PDU session at the target base station side is determined to be UPF non-split, and the target base station side includes only the target master base station, the determined target bearer base station can only be the target master base station; and as shown above, if the target base station side includes the target master base station and at least one target secondary base station, the determined target bearer base station is one base station which carries the PDU session alone at the target base station side.

In addition, it should be understood that a specific time point in the handover process of the terminal from the source base station side to the target base station side at which the user plane function (UPF) split state of the PDU session of the terminal at the target base station side may be flexibly set according to the specific application situations. For example, the UPF split state of the PDU session at the target base station side may be determined after the target base station side successfully completes handover preparations including admission control and resource reservation for the PDU session to be handed over in the handover process of the terminal from the source base station side to the target base station side.

In S302, a base station downlink address allocated to the PDU session by the target bearer base station is acquired.

In this embodiment, the base stations selected as the target bearer base stations at the target base station side will each allocate the base station downlink address to the PDU session. As described above, for example, when the determined target bearer base station includes the target master base station and the second target secondary base station, the target master base station will allocate one base station downlink address to the PDU session, and the second target secondary base station will allocate one base station downlink address to the PDU session. The base station downlink address allocated by each base station belongs to the each base station itself. The base station may allocate the base station downlink address to the PDU session in various manners, which are not described in detail here.

In S303, the acquired base station downlink address is sent to an SMF network element, and a UPF network element uplink address allocated to the target bearer base station is acquired from the SMF network element.

In an example of this embodiment, the UPF network element uplink address may be allocated by an SMF, and then an AMF transmits the UPF network element uplink address allocated by the SMF to the target base station side. Of course, the AMF may also transmit other NGAP interface messages and information to the target base station side. Therefore, in an example of this embodiment, the target base station side may indirectly communicate with the SMF network element through an AMF network element, that is, the base station downlink address is sent to the SMF network element through the AMF network element, and the UPF network element uplink address allocated to the target bearer base station is acquired from the SMF network element through the AMF network element.

In this embodiment, when the acquired base station downlink address is sent to the SMF network element, each base station downlink address may be identified to characterize a base station to which each base station downlink address belongs (that is, the target bearer base station to which each base station downlink address belongs); after the SMF network element receives these base station downlink addresses, the base station downlink addresses may be sent to a UPF network element for subsequent establishment of a data transmission tunnel; and the SMF network element may further allocate the UPF network element uplink address to the target bearer base station to which each base station downlink address belongs. A specific allocation manner may also flexibly adopt various allocation manners, which are not described in detail here. In addition, it should be understood that in this embodiment, the UPF network element uplink addresses allocated to the PDU session at the target base station side and UPF network element uplink addresses allocated to the PDU session at a source base station side may have a same addresses or be completely different, which may be specifically determined according to a practically-used allocation mechanism and a current practical application scenario.

As shown in the above example, when the determined target bearer base station includes the target master base station and the second target secondary base station, the target master base station will allocate a base station downlink address 1 to the PDU session, and the second target secondary base station will allocate a base station downlink address 3 to the PDU session. After receiving these base station downlink addresses, the SMF network element also allocates a UPF network element uplink address 1 to the target master base station and a UPF network element uplink address 3 to the second target secondary base station.

In S304, the acquired UPF network element uplink address is sent to the target bearer base station for the target bearer base station to establish a data transmission tunnel with the UPF network element, where the established data transmission tunnel is used for transmitting the PDU session.

It should be understood that in this embodiment, when the terminal has two or more PDU sessions, data transmission tunnel address coordination may be performed for each PDU session according to the method shown in FIG. 3. Of course, the data transmission tunnel address coordination may be selectively performed for part of PDU sessions (for example, a specific PDU session that is preset to meet a specific condition or rule may be supported) according to the method shown in FIG. 3. Moreover, in the handover process of the terminal, UPF split states of some PDU sessions of the terminal need to be switched, and UPF split states of another some PDU sessions do not need to be switched, or the UPF split states of all the PDU sessions need to be switched, or the UPF split states of all the PDU sessions do not need to be switched.

As shown in the above example, after the UPF network element uplink address 1 allocated to the target master base station and the UPF network element uplink address 3 allocated to the second target secondary base station are acquired, the UPF network element uplink address 1 and the UPF network element uplink address 3 are sent to the target master base station and the second target secondary base station respectively, and the target master base station and the second target secondary base station may each establish the data transmission tunnel with the UPF network element based on the acquired UPF network element uplink address and the base station downlink address allocated to the PDU session by itself.

It should be understood that the steps shown in FIG. 3 may be executed by the target base station side, specifically may be executed by an independent apparatus other than the base stations at the target base station side, or may be executed by the base station at the target base station side. For example, the steps may be executed by the target master base station at the target base station side. The target master base station can directly interact with the AMF/SMF network element through an NG interface to complete the interaction of the base station downlink address and the UPF network element uplink address, and may also communicate with each target secondary base station through an Xn interface to achieve the interaction of the base station downlink address and the UPF network element uplink address. In addition to the target master base station, the steps may also be executed by the target secondary base station at the target base station side. For example, the target secondary base station may use the target master base station as a relay base station to communicate with other target secondary base stations and indirectly interact with the AMF/SMF network element through the Xn interface and then complete the interaction of the base station downlink address and the UPF network element uplink address. Of course, the steps may also be executed jointly by the above-mentioned independent apparatus, target master base station and target secondary base station. Specifically, it may be flexibly set according to factors such as an application scenario. For ease of understanding, this embodiment uses an example in which the target master base station at the target base station side executes the steps shown in FIG. 3 to illustrate the present disclosure. In this case, the target master base station at the target base station side determines the UPF split state at the target base station side of the PDU session of the terminal handed over from the source base station side and the target bearer base station corresponding to the PDU session at the target base station side; the target master base station acquires the base station downlink address allocated by each target bearer base station to the PDU session, sends the base station downlink address to the SMF network element through the AMF network element, and acquires the UPF network element uplink addresses allocated to the target bearer base station from the SMF network element through the AMF network element; and then the target master base station sends the acquired UPF network element uplink address to the corresponding target bearer base station (which may include the target master base station itself) for the target bearer base station to establish the data transmission tunnel with the SMF network element according to the received UPF network element uplink address and the base station downlink address allocated to the PDU by itself. A specific manner for establishing the data transmission tunnel may flexibly adopt various tunnel establishment manners, which are not described in detail here.

Figure 4:
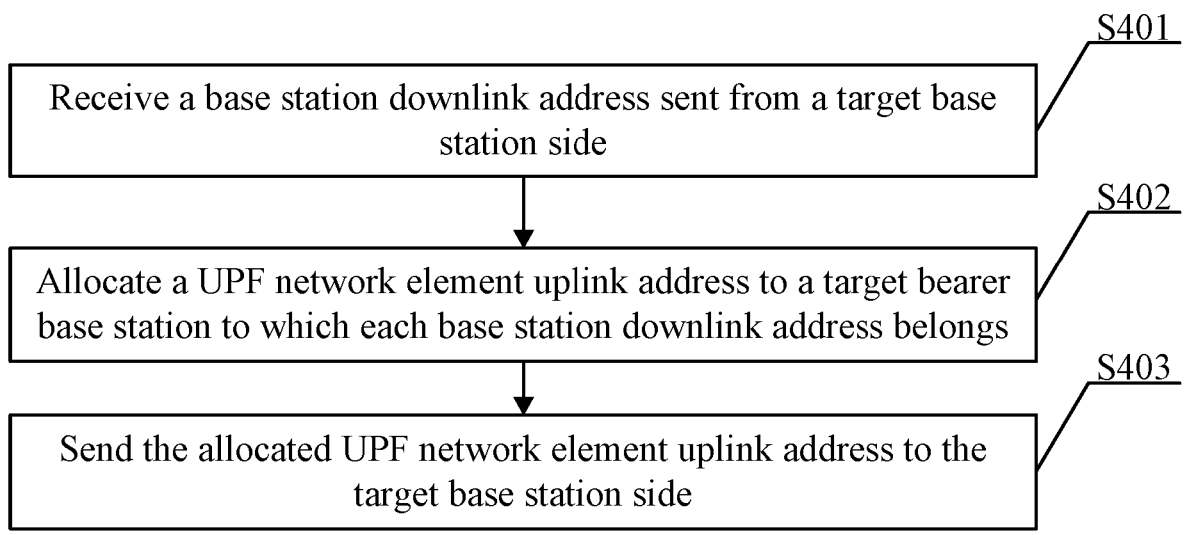
FIG. 4 is a flowchart of a data transmission tunnel address coordination method on an SMF network element side according to an embodiment one of the present disclosure.

This embodiment further provides a data transmission tunnel address coordination method at an SMF network element side. As shown in FIG. 4, the method includes steps described below.

In S401, a base station downlink address sent from a target base station side is received.

As shown above, the base station downlink address is acquired by the target base station side from a target bearer base station for carrying a PDU session of a terminal at the target base station side in a handover process of the terminal from a source base station side to the target base station side. Optionally, in this embodiment, an SMF network element may receive the base station downlink address from the target base station side through an AMF network element.

In S402, a UPF network element uplink address is allocated to the target bearer base station to which each base station downlink address belongs.

It should be understood that in this embodiment, a manner for allocating the UPF network element uplink address to each target bearer base station may flexibly adopt various allocation manner such as load balance control, which are not described in detail here.

In S403, the allocated UPF network element uplink address is sent to the target base station side. Optionally, the UPF network element uplink address may be sent to the target base station side through the AMF network element.

As described above, in this step, the UPF network element uplink address may be sent to a target master base station.

In this embodiment, in the handover process of the terminal from the source base station side to the target base station side, the UPF split state of the PDU session of the terminal may be determined and the data transmission tunnel address coordination may be implemented. For example, if the UPF split state of the PDU session of the terminal on the source base station side is UPF non-split, and it is determined that the UPF split state needs to become UPF split after the handover to the target base station side, the data transmission tunnel address coordination may be implemented according to the determined UPF split state, and a PDU session resource modify/modification indication and other processes do not need to be executed again after the terminal completes the handover to perform the data transmission tunnel address coordination, improving flexibility of PDU session split control in the handover process of the terminal and resource admission control efficiency at the target base station side, enabling the PDU session to enter the split state to be entered at the target base station side as soon as possible, and further saving signaling resources between the target base station side and a core network.

Embodiment Two

Figure 5:
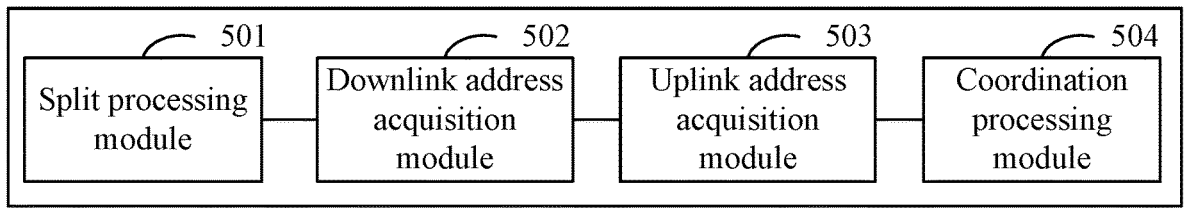
FIG. 5 is a structural diagram of a data transmission tunnel address coordination device on a target base station side according to an embodiment two of the present disclosure.

This embodiment provides a data transmission tunnel address coordination device. As shown in FIG. 5, the device includes a split processing module 501, a downlink address acquisition module 502, an uplink address acquisition module 503 and a coordination processing module 504.

The split processing module 501 is configured to: in a handover process of a terminal from a source base station side to a target base station side, determine a user plane function (UPF) split state of a protocol data unit (PDU) session of the terminal at the target base station side, and a target bearer base station for carrying the PDU session at the target base station side. A specific determination process is shown in the above embodiment and not described in detail here.

The downlink address acquisition module 502 is configured to acquire a base station downlink address allocated to the PDU session by the target bearer base station. A specific acquisition process is shown in the above embodiment and not described in detail here.

The uplink address acquisition module 503 is configured to send the base station downlink address acquired by the downlink address acquisition module 502 to an SMF network element, and acquire from the SMF network element a UPF network element uplink address allocated to the target bearer base station. A specific acquisition process is shown in the above embodiment and not described in detail here.

The coordination processing module 504 is configured to send the UPF network element uplink address acquired by the uplink address acquisition module 503 to the target bearer base station for the target bearer base station to establish a data transmission tunnel with a UPF network element, where the established data transmission tunnel is used for transmitting the PDU session. A specific acquisition process is shown in the above embodiment and not described in detail here.

The data transmission tunnel address coordination device shown in FIG. 5 may be disposed at the target base station side, specifically on an independent apparatus other than base stations at the target base station side or on a target master base station at the target base station side or on a target secondary base station at the target base station side. Moreover, the functions of the above-mentioned modules of the data transmission tunnel address coordination device may be implemented by a processor of the above-mentioned independent apparatus, target master base station or target secondary base station.

Figure 6:
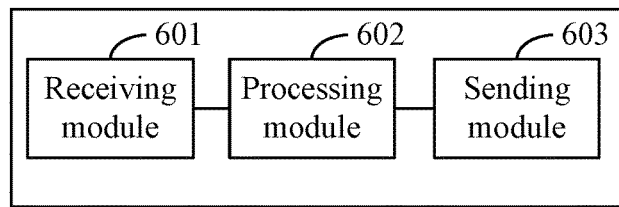
FIG. 6 is a structural diagram of a data transmission tunnel address coordination device on an SMF network element side according to an embodiment two of the present disclosure.

This embodiment further provides a data transmission tunnel address coordination device on an SMF network element side. As shown in FIG. 6, the device includes a receiving module 601, a processing module 602 and a sending module 603.

The receiving module 601 is configured to receive a base station downlink address sent from a target base station side. Optionally, the receiving module 601 may receive the base station downlink address from the target base station side through an AMF network element. As shown in the above embodiment, the base station downlink address is acquired by the target base station side from a target bearer base station for carrying a PDU session of a terminal at the target base station side in a handover process of the terminal from a source base station side to the target base station side.

The processing module 602 is configured to allocate a UPF network element uplink address to the target bearer base station to which the base station downlink address belongs.

The sending module 603 is configured to send the UPF network element uplink address to the target base station side. Optionally, the sending module 603 may send the UPF network element uplink address to the target base station side through the AMF network element.

The data transmission tunnel address coordination device shown in FIG. 6 may be disposed on the SMF network element side, specifically on an SMF network element or on a new network element specially disposed for performing address coordination or on another network element that can execute this function. Moreover, the functions of the above-mentioned modules of the data transmission tunnel address coordination device may be implemented by a processor of the above-mentioned network element.

Figure 7:
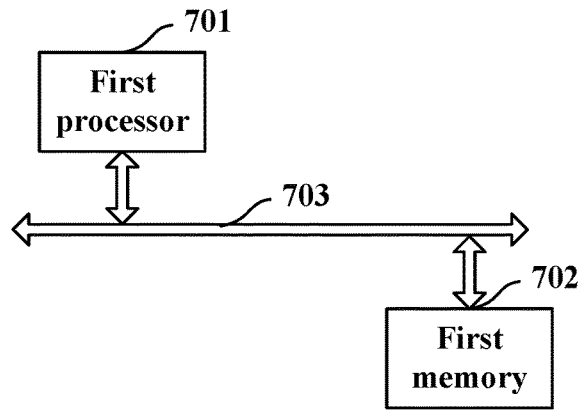
FIG. 7 is a structural diagram of a base station according to an embodiment two of the present disclosure.

This embodiment further provides a base station which may be disposed on a target base station side and may be a target master base station, a target secondary base station or a base station dedicated for implementing address coordination. As shown in FIG. 7, the base station includes a first processor 701, a first memory 702 and a first communication bus 703.

The first communication bus 703 is configured to implement connection and communication between the first processor 701 and the first memory 702.

The first processor 701 is configured to execute one or more first programs stored in the first memory 701 to implement steps of the data transmission tunnel address coordination method in the above embodiment.

Figure 8:
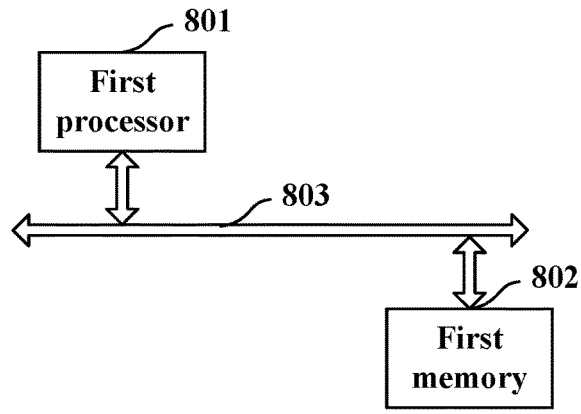
FIG. 8 is a structural diagram of an SMF network element according to an embodiment two of the present disclosure.

This embodiment further provides an SMF network element. The SMF network element may include the SMF network element, and may also include an AMF network element. As shown in FIG. 8, the SMF network element includes a second processor 801, a second memory 802 and a second communication bus 803.

The second communication bus 803 is configured to implement connection and communication between the second processor 801 and the second memory 802.

The second processor 801 is configured to execute one or more second programs stored in the second memory 801 to implement steps of the data transmission tunnel address coordination method in the above embodiment.

This embodiment further provides a computer-readable storage medium applied to a target base station side. The computer-readable storage medium stores one or more first programs executed by one or more first processors to implement steps of the data transmission tunnel address coordination method in the above embodiment.

This embodiment further provides a computer-readable storage medium applied to an SMF network element side. The computer-readable storage medium stores one or more second programs executed by one or more second processors to implement steps of the data transmission tunnel address coordination method in the above embodiment.

Embodiment Three

For a better understanding of the present disclosure, this embodiment illustrates an "SC-to-DC" handover scenario and a certain PDU session of a terminal in a handover process of the terminal from a source base station side to a target base station side.

When a UE in a CM-connected state moves across base stations, a specific PDU session of the UE may be in any one of a UPF split state or a UPF non-split state on the source base station side before the handover and at the target base station side after the handover. In this embodiment, which state the PDU session is specifically in may be determined by a target master node (MN) at the target base station side.

In this embodiment, the "SC-to-DC" handover scenario refers to the handover from a single source NG-RAN node (that is, the source base station side includes only a source MN) to target MN and SN. In this case, the PDU session is in a single connectivity data transmission mode on the source base station side, so the PDU session can only be in the UPF non-split state. In the handover process, if the target MN decides to directly switch the PDU session from the UPF non-split state to the UPF split state, the target MN and SN are both target bearer base stations for carrying the PDU session and each need to allocate a base station downlink address belonging to itself to the PDU session (in this way, after the handover, part of QoS flows of the PDU session is anchored on an MN side, and the other part of the QoS flows is anchored on an SN side). If the target MN decides to maintain the PDU session in the UPF non-split state, the target MN or SN is the target bearer base station (which may also be referred to as a target anchor) for carrying the PDU session, and the target anchor, MN or SN, only needs to allocate a downlink address belonging to itself to the PDU session (in this way, after the handover, all the QoS flows of the PDU session are anchored on the MN side or on the SN side).

In this embodiment, the target MN may provide a control plane function (such as an AMF/SMF) network element with the respective base station downlink address allocated by the target MN/SN side for a data transmission tunnel through a PATH SWITCH REQUEST message or a HANDOVER REQUEST ACKNOWLEDGE message.

Subsequently, if the PDU session is switched to the UPF split state, the SMF network element needs to allocate two UPF network element uplink addresses to the PDU session for separate use at the MN side and the SN side. If the PDU session is maintained in the UPF non-split state, the SMF only needs to allocate one UPF network element uplink address to the PDU session for use on the MN or SN side.

The AMF/SMF may provide the target MN with the respective UPF network element uplink address on the MN/SN side for the data transmission tunnel through a PATH SWITCH REQUESTACKNOWLEDGE message or a HANDOVER REQUEST message.

It should be understood that in this embodiment, in addition to the PATH SWITCH REQUEST message and the PATH SWITCH REQUESTACKNOWLEDGE message as well as the HANDOVER REQUEST ACKNOWLEDGE message and the HANDOVER REQUEST message, the target MN and the AMF/SMF may also interact by using other messages according to specific application scenarios, as long as the interaction of the above addresses can be implemented.

The base station downlink address and the UPF network element uplink address corresponding to the target SN side may be transferred between the target MN and a target SN through an XnAP (that is, an Xn interface application layer protocol) message flow: SN Addition/Modification. Of course, the interaction of the base station downlink address and the UPF network element uplink address between the target SN and the target MN may also be achieved by using any other message.

For example, the target SN may transfer the base station downlink address to the MN through an XnAP new message flow: RAN TNL INFO INDICATION; and the target MN may transfer the UPF network element uplink address to the target SN through an XnAP new message flow: UPF TNL INFO INDICATION.

In this embodiment, the UPF network element uplink address may form a flexible configuration and use relationship with the MN/SN. For example, a certain UPF network element uplink address may be configured to be specially used by the data transmission tunnel of the target MN or a certain target SN, and may also be configured to be shared by the target MN and at least one (for example, one) target SN. In this case, at least two data transmission tunnels share one UPF network element uplink address.

It should be understood that if an "SC-to-DC" scenario is extended to an "SC-to-MC" scenario, that is, the number N of target base stations at the target base station side is greater than or equal to 3, and the PDU session of the terminal is switched to the UPF split state, then the number of base station downlink addresses and the number of UPF network element uplink addresses will increase correspondingly with the number of multiple connections, that is, increase from 2 to N (that is, the number of multiple connections).

For ease of understanding, the following two specific application scenarios are illustrated.

Scenario One

Figure 9:
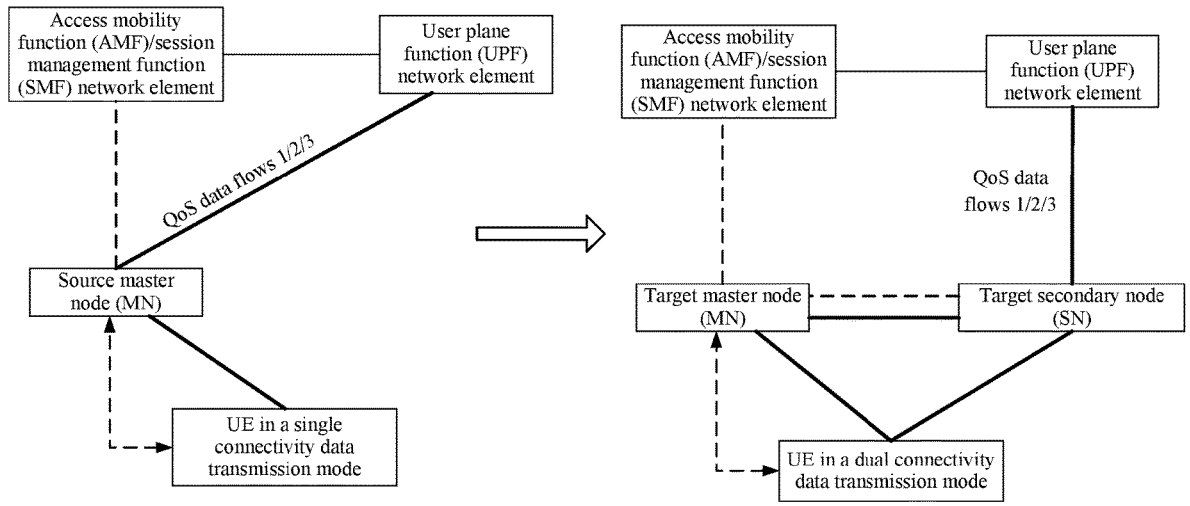
FIG. 9 is a schematic diagram illustrating handover from single connectivity to dual connectivity and from a single tunnel to a single tunnel according to an embodiment three of the present disclosure.

As shown in FIG. 9, a certain UE is in a single connectivity working mode disposed at the source base station side and has only one PDU session which includes three QoS flows 1/2/3. Only one GTP data transmission tunnel exists between the source MN at the source base station side and a UPF, and this tunnel corresponds to a UPF uplink data transmission channel address 1 and a downlink data transmission channel address 1 at the MN side. Since the UE moves across base stations, after the UE moves to and accesses the target base station side, the UE is directly configured to enter a dual connectivity working mode. The target MN decides to transfer the PDU session in whole to the target SN side (the target SN side is the target anchor). Therefore, the PDU session is maintained in the UPF non-split state, the target anchor, SN, only needs to allocate a base station downlink address belonging to itself to the PDU session, and the MN does not need to allocate any base station downlink address belonging to itself to the PDU session and only need to implement information transfer and interaction. A specific process is described below.

(1) The target SN allocates the base station downlink address belonging to itself (a downlink data transmission channel address on the SN side) to the PDU session and transfers it to the target MN through an XnAP message: SN ADDITION REQUEST ACKNOWLEDGE.

(2) The target MN provides the AMF/SMF with the base station downlink address allocated by the target SN side for the data transmission tunnel through the PATH SWITCH REQUEST message or the HANDOVER REQUEST ACKNOWLEDGE message.

(3) Since the PDU session is maintained in the UPF non-split state, the SMF only needs to allocate one UPF network element uplink address to the PDU session for uplink use on the SN side.

(4) The AMF/SMF transfers the UPF network element uplink address allocated to the SN side for the data transmission tunnel to the target MN through the PATH SWITCH REQUEST ACKNOWLEDGE message or the HANDOVER REQUEST message.

(5) The target MN transfers the UPF network element uplink address corresponding to the SN side to the SN side for use through an XnAP message: SN RECONFIGURATION COMPLETE.

(6) According to the above address coordination manner, one GTP data transmission tunnel is successfully established between the target SN and the UPF based on the acquired addresses, where the GTP data transmission tunnel is used for the subsequent transmission and service of all the QoS flows 1/2/3 in the PDU session.

Scenario Two

Figure 10:
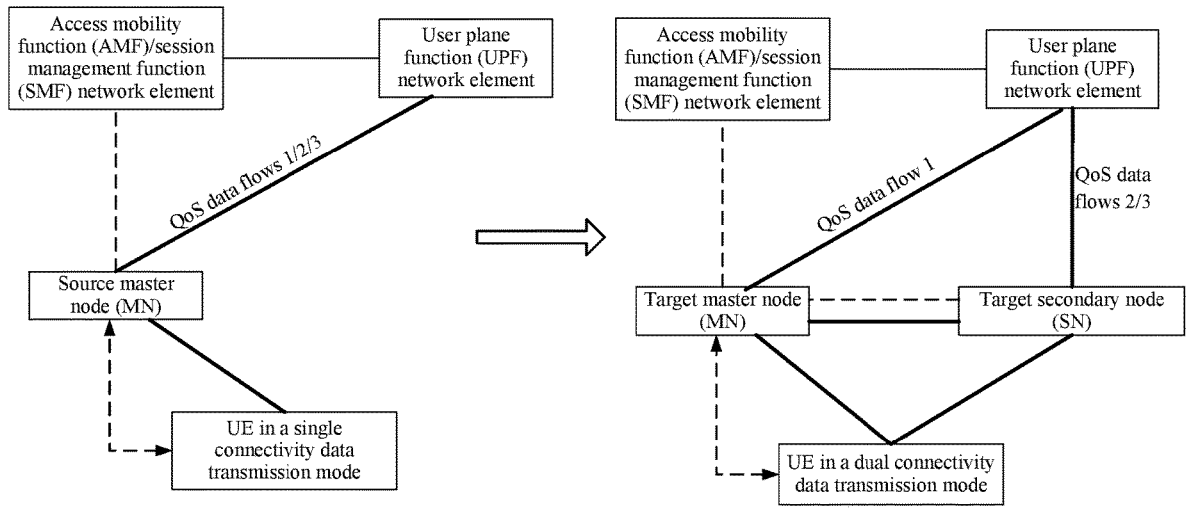
FIG. 10 is a schematic diagram illustrating handover from single connectivity to dual connectivity and from a single tunnel to double tunnels according to an embodiment three of the present disclosure.

As shown in FIG. 10, a certain UE is in the single connectivity working mode at the source base station side and has only one PDU session which includes three QoS flows 1/2/3. Only one GTP data transmission tunnel exists between the source MN at the source base station side and the UPF, and this tunnel corresponds to the UPF uplink data transmission channel address 1 and the downlink data transmission channel address 1 at the MN side. Since the UE moves across base stations, after the UE moves to and accesses the target base station side, the UE is directly configured to enter the dual connectivity working mode. The target MN decides to transfer QoS flows 2/3 in the PDU session to the target SN side and maintain QoS flow 1 on the target MN side. Therefore, the PDU session is switched to the UPF split state, the target anchors, MN and SN, each need to allocate a base station downlink address belonging to itself to the PDU session, and the MSF needs to allocate two UPF uplink data transmission channel addresses to the PDU session. A specific process is described below.

(1) The target SN allocates the base station downlink address belonging to itself (the downlink data transmission channel address on the SN side) to the PDU session and transfers it to the target MN through an XnAP message: RAN TNL INFO INDICATION.

(2) The target MN provides the AMF/SMF with the respective base station downlink addresses (two downlink addresses in total) allocated by the target MN side and the target SN side for the data transmission tunnels through the PATH SWITCH REQUEST message or the HANDOVER REQUEST ACKNOWLEDGE message.

(3) Since the PDU session is switched to the UPF split state, the SMF needs to allocate two UPF network element uplink addresses 11 and 22 to the PDU session for uplink use on the MN side and the SN side, respectively.

(4) The AMF/SMF transfers the UPF network element uplink addresses 11 and 22 allocated to the MN side and the SN side for two data transmission tunnels to the target MN through the PATH SWITCH REQUEST ACKNOWLEDGE message or the HANDOVER REQUEST message. After receiving the UPF network element uplink addresses 11 and 22, the target MN stores and uses the UPF network element uplink address 11 corresponding to the MN side.

(5) The target MN transfers the UPF network element uplink address 22 corresponding to the SN side to the SN side for use through an XnAP message: UPF TNL INFO INDICATION.

(6) According to the above address coordination manner, two GTP data transmission tunnels are successfully established between the target MN/SN and the UPF based on the acquired addresses, where the GTP data transmission tunnels are separately used for the subsequent transmission and service of the QoS flow 1 and the QoS flows 2/3 in the PDU session which is in the UPF split state.

Embodiment Four

For a better understanding of the present disclosure, this embodiment illustrates a "DC-to-DC" handover scenario and a certain PDU session of a terminal in a handover process of the terminal from a source base station side to a target base station side.

When a UE in a CM-connected state moves across base stations, a certain PDU session of the UE may be in any one of a UPF split state or a UPF non-split state on the source base station side before the handover and at the target base station side after the handover. In this embodiment, which state the PDU session is specifically in is still determined by a target master node (MN) at the target base station side.

The "DC-to-DC" scenario in this embodiment refers to the handover from source master and secondary nodes (MN/SN) to target master and secondary nodes (MN/SN). In this case, the PDU session may be in the UPF non-split or UPF split state on the source base station side. If the target MN determines that the PDU session needs to be in the UPF split state at the target base station side, the target MN and SN each need to allocate a base station downlink address belonging to itself to the PDU session (in this way, after the handover, part of QoS flows of the PDU session is anchored on an MN side, and the other part of the QoS flows is anchored on an SN side). If the target MN decides to directly switch the PDU session to the UPF non-split state, the target MN may select itself or a target SN to carry the PDU session alone. In this case, the target anchor, MN or SN, only needs to allocate the base station downlink address belonging to itself to the PDU session (in this way, after the handover, all the QoS flows of the PDU session are anchored on the MN side or on the SN side).

In this embodiment, the target MN may also provide a control plane function (such as an AMF/SMF) network element with the respective base station downlink address allocated by the target MN/SN side for a data transmission tunnel through a PATH SWITCH REQUEST message or a HANDOVER REQUEST ACKNOWLEDGE message.

Subsequently, if the PDU session is switched to the UPF split state, the SMF network element needs to allocate two UPF network element uplink addresses to the PDU session for separate use on the MN side and the SN side. If the PDU session is switched to the UPF non-split state, the SMF network element only needs to allocate one UPF network element uplink address to the PDU session for use on the MN side or the SN side. If two UPF network element uplink addresses are previously allocated to the PDU session on the source base station side, at least one of the addresses may be released and taken back by the SMF network element.

The AMF/SMF may provide the target MN with the respective UPF network element uplink address on the MN/SN side for the data transmission tunnel through a PATH SWITCH REQUESTACKNOWLEDGE message or a HANDOVER REQUEST message. It should be understood that in this embodiment, in addition to the PATH SWITCH REQUEST message and the PATH SWITCH REQUESTACKNOWLEDGE message as well as the HANDOVER REQUEST ACKNOWLEDGE message and the HANDOVER REQUEST message, the target MN and the AMF/SMF may also interact by using other messages according to specific application scenarios, as long as the interaction of the above addresses can be implemented.

The base station downlink address and the UPF network element uplink address corresponding to the target SN side may be transferred between the target MN and the target SN through an XnAP message flow: SN Addition/Modification. Of course, the interaction of the base station downlink address and the UPF network element uplink address between the target SN and the target MN may also be achieved by using any other message.

For example, the target SN may transfer the base station downlink address to the MN through an XnAP new message flow: RAN TNL INFO INDICATION; and the target MN may transfer the UPF network element uplink address to the target SN through an XnAP new message flow: UPF TNL INFO INDICATION.

In this embodiment, the UPF network element uplink address may form a flexible configuration and use relationship with the MN/SN. For example, a certain UPF network element uplink address may be configured to be specially used by the data transmission tunnel of the target MN or a certain target SN, and may also be configured to be shared by the target MN and a certain target SN.

It should be understood that if the "DC-to-DC" scenario is extended to a "DC-to-MC", "MC-to-DC" or "MC-to-MC" scenario, and the PDU session is switched to the UPF split state, then the number of base station downlink addresses and the number of UPF network element uplink addresses will increase correspondingly with the number of multiple connections, that is, increase from 2 to N (that is, the number of multiple connections).

For ease of understanding, the following two specific application scenarios are illustrated.

Scenario Three

Figure 11:
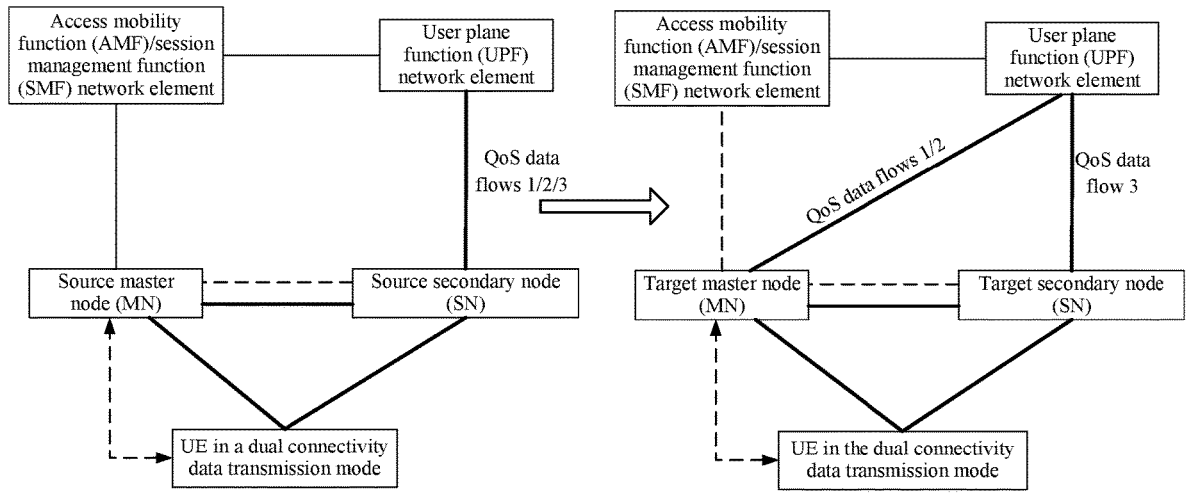
FIG. 11 is a schematic diagram illustrating handover from dual connectivity to dual connectivity and from a single tunnel to double tunnels according to an embodiment four of the present disclosure.

As shown in FIG. 11, a certain UE is in a dual connectivity working mode at the source base station side and has only one PDU session which includes three QoS flows 1/2/3. All the QoS flows 1/2/3 are anchored on a source SN side. Only one GTP data transmission tunnel exists between a source SN at the source base station side and a UPF, and this tunnel corresponds to a UPF uplink data transmission channel address 2 and a downlink data transmission channel address 2 at the SN side. Since the UE moves across base stations, after the UE moves to and accesses the target base station side, the UE is directly configured to enter the dual connectivity working mode. The target MN decides to transfer QoS flows 1/2 in the PDU session to the target MN side and maintain QoS flow 3 at the target SN side. Therefore, the PDU session is switched to the UPF split state, target anchors, MN and SN, each need to allocate a base station downlink address belonging to itself to the PDU session, and the UPF needs to allocate two UPF uplink data transmission channel addresses to the PDU session. A specific process is described below.

(1) The target SN allocates the base station downlink address belonging to itself (a downlink data transmission channel address on the SN side) to the PDU session and transfers it to the target MN through an XnAP message: RAN TNL INFO INDICATION.

(2) The target MN provides the AMF/SMF with the respective base station downlink addresses (two downlink addresses in total) allocated by the target MN side and the target SN side for the data transmission tunnels through the PATH SWITCH REQUEST message or the HANDOVER REQUEST ACKNOWLEDGE message.

(3) Since the PDU session is switched to the UPF split state, the SMF needs to allocate two UPF network element uplink addresses 11 and 22 to the PDU session for uplink use on the MN side and the SN side, respectively.

(4) The AMF/SMF transfers the UPF network element uplink addresses 11 and 22 allocated to the MN side and the SN side for two data transmission tunnels to the target MN through the PATH SWITCH REQUEST ACKNOWLEDGE message or the HANDOVER REQUEST message. After receiving the UPF network element uplink addresses 11 and 22, the target MN stores and uses the UPF network element uplink address 11 corresponding to the MN side.

(5) The target MN transfers the UPF network element uplink address 22 corresponding to the target SN side to the target SN side for use through an XnAP message: UPF TNL INFO INDICATION.

(6) According to the above address coordination manner, two GTP data transmission tunnels are successfully established between the target MN/SN and the UPF, where the GTP data transmission tunnels are separately used for the subsequent transmission and service of the QoS flows 1/2 and the QoS flow 3 in the PDU session which is in the UPF split state.

Scenario Four

Figure 12:
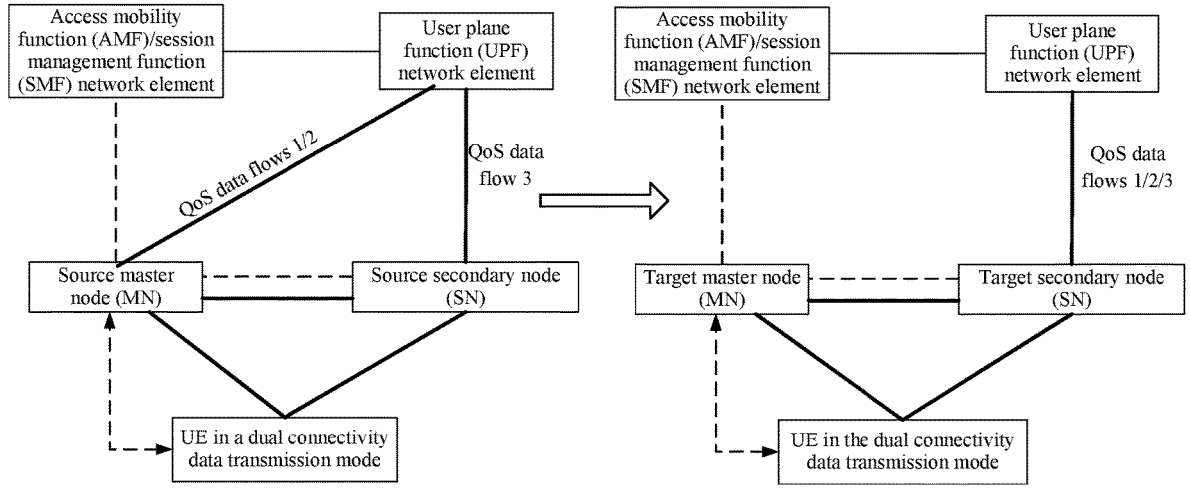
FIG. 12 is a schematic diagram illustrating handover from dual connectivity to dual connectivity and from double tunnels to a single tunnel according to an embodiment four of the present disclosure.

As shown in FIG. 12, a certain UE is in the dual connectivity working mode at the source base station side and has only one PDU session which includes three QoS flows 1/2/3. The source MN on the source base station side decides to anchor the QoS flows 1/2 in the PDU session at the source MN side and anchor the QoS flow 3 at the source SN side. Two GTP data transmission tunnels exist between the source MN/SN at the source base station side and the UPF, and these tunnels correspond to two UPF uplink data transmission channel addresses 1 and 2 and respective downlink data transmission channel addresses at the MN side and the SN side. Since the UE moves across base stations, after the UE moves to and accesses the target base station side, the UE is directly configured to enter the dual connectivity working mode. The target MN decides to transfer all the QoS flows 1/2/3 in the PDU session to the target SN side. Therefore, the PDU session is switched to the UPF non-split state, the target SN needs to allocate a base station downlink address belonging to itself to the PDU session, the UPF only needs to allocate one UPF uplink data transmission channel address to the PDU session, and the target MN does not need to allocate a base station downlink address belonging to itself to the PDU session. A specific process is described below.

(1) The target SN allocates the base station downlink address belonging to itself (the downlink data transmission channel address on the SN side) to the PDU session and transfers it to the target MN through the XnAP message: RAN TNL INFO INDICATION.

(2) The target MN provides the AMF/SMF with the base station downlink address (one downlink address) allocated by the target SN side for the data transmission tunnel through the PATH SWITCH REQUEST message or the HANDOVER REQUEST ACKNOWLEDGE message.

(3) Since the PDU session is switched to the UPF non-split state, the SMF only needs to allocate the UPF network element uplink address 22 to the PDU session for uplink use on the SN side.

The other previously allocated UPF network element uplink address 11 may be recycled and deleted by the SMF.

(4) The AMF/SMF transfers the UPF network element uplink address 22 allocated to the target SN side for the data transmission tunnel to the target MN through the PATH SWITCH REQUEST ACKNOWLEDGE message or the HANDOVER REQUEST message.

(5) The target MN transfers the UPF network element uplink address 22 corresponding to the target SN side to the target SN side for use through the XnAP message: UPF TNL INFO INDICATION.

(6) According to the above address coordination manner, one GTP data transmission tunnel is successfully established between the target SN and the UPF, where the GTP data transmission tunnel is used for the subsequent transmission and service of all the QoS flows 1/2/3 in the PDU session which is in the UPF non-split state.

Embodiment Five

For a better understanding of the present disclosure, this embodiment illustrates a "DC-to-SC" handover scenario and a certain PDU session of a terminal in a handover process of the terminal from a source base station side to a target base station side.

When a UE in a CM-connected state moves across base stations, a specific PDU session of the UE may be in any one of a UPF split state or a UPF non-split state on the source base station side before the handover and at the target base station side after the handover. In this embodiment, which state the PDU session is specifically in may be determined by a target master node (MN) at the target base station side.

The "DC-to-SC" scenario in this embodiment refers to the handover from source master and secondary nodes (MN/SN) to a single target NG-RAN node (which is referred to as the inclusion of only the target MN in this embodiment). In this case, the PDU session can only be in the UPF non-split state at the target base station side. If the PDU session is in the UPF split state on the source base station side, the target MN can only directly switch the PDU session to the UPF non-split state. If the PDU session is in the UPF non-split state on the source base station side, the target MN maintains the PDU session in the UPF non-split state, and the target MN only needs to allocate a base station downlink address belonging to itself to the PDU session.

In this embodiment, the target MN may provide a control plane function (such as an AMF/SMF) network element with the base station downlink address allocated by the target MN for a data transmission tunnel through a PATH SWITCH REQUEST message or a HANDOVER REQUEST ACKNOWLEDGE message.

Subsequently, the PDU session is switched to the UPF non-split state, and the SMF only needs to allocate one UPF network element uplink address to the PDU session for use by the target MN. If two UPF network element uplink addresses are previously allocated to the PDU session on the source base station side, one of the addresses may be released and taken back by the SMF.

The AMF/SMF may provide the single target base station with the UPF network element uplink address on the single target base station side for the data transmission tunnel through a PATH SWITCH REQUESTACKNOWLEDGE message or a HANDOVER REQUEST message. It should be understood that in this embodiment, in addition to the PATH SWITCH REQUEST message and the PATH SWITCH REQUESTACKNOWLEDGE message as well as the HANDOVER REQUEST ACKNOWLEDGE message and the HANDOVER REQUEST message, the target MN and the AMF/SMF may also interact by using other messages according to specific application scenarios, as long as the interaction of the above addresses can be implemented.

It should be understood that if the "DC-to-SC" scenario is extended to an "MC-to-SC" scenario, the PDU session is switched to the UPF non-split state, and two, three or more UPF network element uplink addresses are previously allocated to the PDU session, then the number of UPF network element uplink addresses released and taken back will increase correspondingly with the number of multiple connections, that is, increase from 1 to N−1 (N is the number of multiple connections).

For ease of understanding, the following one specific application scenario is illustrated.

Figure 13:
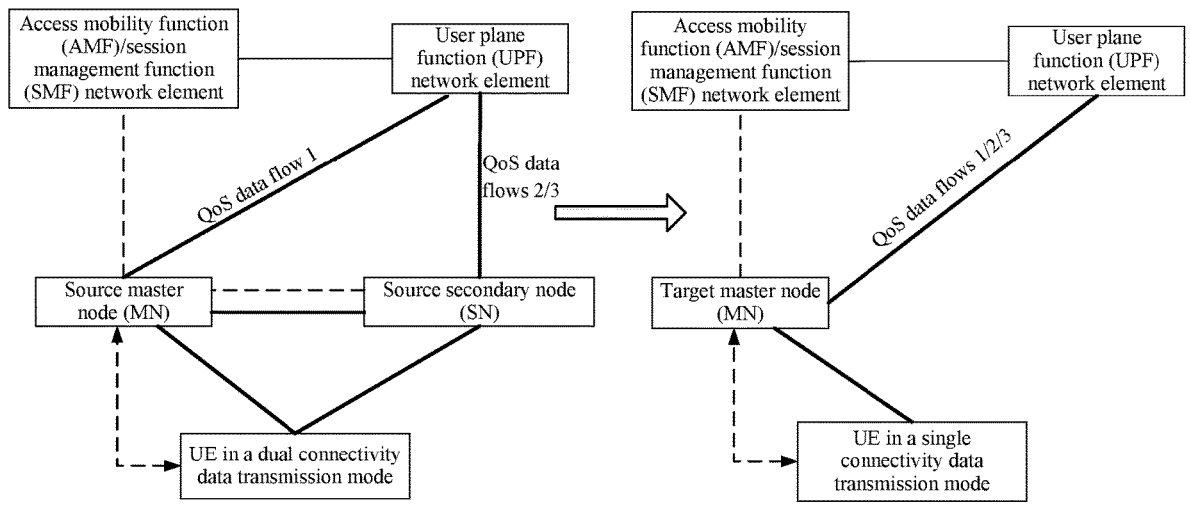
FIG. 13 is a schematic diagram illustrating handover from dual connectivity to single connectivity and from double tunnels to a single tunnel according to an embodiment five of the present disclosure.

As shown in FIG. 13, a certain UE is in a dual connectivity working mode at the source base station side and has only one PDU session which includes three QoS flows 1/2/3. A source MN on the source base station side decides to anchor QoS flow 1 in the PDU session on a source MN side and anchor QoS flows 2/3 on a source SN side. Two GTP data transmission tunnels exist between the source MN/SN at the source base station side and the UPF, and these tunnels correspond to two UPF uplink data transmission addresses 11 and 22 and respective downlink data transmission channel addresses at the MN side and the SN side. Since the UE moves across base stations, after the UE moves to and accesses the target base station side, the UE is directly configured to enter a single connectivity working mode. The target MN can only transfer all the QoS flows 1/2/3 in the PDU session to the target MN side. Therefore, the PDU session is switched to the UPF non-split state, the target MN needs to allocate a base station downlink address belonging to itself to the PDU session, and a UPF only needs to allocate one UPF uplink data transmission channel address to the PDU session. A target SN is deleted after entering SC. A specific process is described below.

(1) The target MN allocates the base station downlink address belonging to itself (that is, a downlink data transmission channel address on the MN side) to the PDU session, and the target SN is deleted after entering the SC.

(2) The target MN provides the AMF/SMF with the base station downlink address (only one downlink address is included) allocated by the target MN side for the data transmission tunnel through the PATH SWITCH REQUEST message or the HANDOVER REQUEST ACKNOWLEDGE message.

(3) Since the PDU session is switched to the UPF non-split state, the SMF only needs to allocate a UPF network element uplink address 11 (which may be the same as or different from a UPF network element uplink address 11 previously allocated on the source base station side) to the PDU session for uplink use on the MN side. The other previously allocated UPF network element uplink address 22 on the source base station side may be recycled and deleted by the SMF.

(4) The AMF/SMF transfers the UPF network element uplink address 11 allocated to the MN side for the data transmission tunnel to the target MN through the PATH SWITCH REQUEST ACKNOWLEDGE message or the HANDOVER REQUEST message.

(5) According to the above address coordination manner, one GTP data transmission tunnel is successfully established between the target MN and the UPF, where the GTP data transmission tunnel is used for the subsequent transmission and service of all the QoS flows 1/2/3 in the PDU session which is in the UPF non-split state.

The data transmission tunnel address coordination method illustrated by the present disclosure can overcome a limitation that a PDU session cannot be switched between a UPF split state and a UPF non-split state in a cross-base station handover process in the existing art, enhance the flexibility of split control in a PDU session switching process, and prevent the target base station side from executing the PDU session resource modify/modification indication and other processes again to perform the data transmission tunnel address coordination. The resource admission control efficiency of the target base station side can be improved so that the PDU session enters a more reasonable state of UPF split or UPF non-split as soon as possible, and the signaling resources between the base station and the core network can be saved.

Apparently, it should be understood by those skilled in the art that each of the above-mentioned modules or steps in the embodiments of the present disclosure may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a computer storage medium (such as a read-only memory (ROM)/random access memory (RAM), a magnetic disk or an optical disk) and executed by the computing devices. In some circumstances, the illustrated or described steps may be executed in sequences different from those described herein, or the modules or steps are made into various integrated circuit modules separately, or multiple modules or steps therein are made into a single integrated circuit module for implementation. Therefore, the present disclosure is not limited to any specific combination of hardware and software.

The preceding is a more detailed description of embodiments of the present disclosure in conjunction with implementations. The description is not intended to limit embodiments of the present disclosure. For those skilled in the art to which the present disclosure pertains, a number of simple deductions or substitutions not departing from the concept of the present disclosure may be made and should fall within the scope of the present disclosure.

INDUSTRIAL APPLICABILITY

The present disclosure is applicable to the field of communications and used for enhancing the flexibility of split control of the PDU session in the handover process of the terminal and preventing the target base station side from executing the PDU session resource modify/modification indication and other processes again to perform the data transmission tunnel address coordination after the terminal completes the handover. The resource admission control efficiency of the target base station side can be improved so that the PDU session enters the split state to be entered at the target base station side as soon as possible, and the signaling resources between the target base station side and the core network can be saved.

I claim:

1. A data transmission tunnel address coordination method, comprising:
   in a handover process of a terminal from a source base station side to a target base station side, determining a protocol data unit (PDU) session split by a target master base station, and determining, by the target master base station, a target secondary base station for carrying the PDU session;
   acquiring a first downlink address allocated to the PDU session by the target secondary base station;
   before the handover process is completed, sending the first downlink address allocated by the target secondary base station and a second downlink address allocated by the target master base station to a session management function (SMF) network element in a core network;
   acquiring a first uplink address allocated to the target master base station and a second uplink address allocated to the target secondary base station, from the SMF network element; and
   before the handover process is completed, sending the second uplink address to the target secondary base station for the target secondary base station to establish a data transmission tunnel with a user plane function (UPF) network element, wherein the data transmission tunnel is used for transmitting the PDU session.

2. The data transmission tunnel address coordination method of claim 1, further comprising sending, by the target master base station, the first downlink address to the SMF network element through an access mobility function (AMF) network element in the core network, and acquiring, by the target master base station, from the SMF network element through the AMF network element the first uplink address and the second uplink address.

3. The data transmission tunnel address coordination method of claim 2, further comprising forwarding, by the target master base station, the second uplink address to the target secondary base station for the target secondary base station to establish, according to the received second uplink address and the first downlink address allocated to the PDU session by the target secondary base station, the data transmission tunnel with the UPF network element.

4. The data transmission tunnel address coordination method of claim 1, further comprising forwarding, by the target master base station, the second uplink address to the target secondary base station for the target secondary base station to establish, according to the received second uplink address and the first downlink address allocated to the PDU session by the target secondary base station, the data transmission tunnel with the UPF network element.

5. A data transmission tunnel address coordination method, comprising:
   in a handover process of a terminal from a source base station side to a target base station side, receiving a first downlink address and a second downlink address sent from a target master base station, wherein the first downlink address is allocated to a protocol data unit (PDU) session by a target secondary base station and the second downlink address is allocated by the target master base station, wherein the PDU session is determined to be split by the target master base station;
   allocating a first uplink address allocated to the target master base station and a second uplink address allocated to the target secondary base station; and
   before the handover process is completed, forwarding the second uplink address to the target base station side.

6. A base station, comprising a first processor, a first memory and a first communication bus; wherein:
   the first communication bus is configured to implement connection and communication between the first processor and the first memory; and the first processor is configured to execute one or more first programs stored in the first memory to implement steps of:
- in a handover process of a terminal from a source base station side to a target base station side, determining a protocol data unit (PDU) session split by the base station, and determining a target secondary base station for carrying the PDU session;
- acquiring a first downlink address allocated to the PDU session by the target secondary base station;
- before the handover process is completed, sending the first downlink address allocated by the target secondary base station and a second downlink address allocated by the base station to a session management function (SMF) network element in a core network;
- acquiring, a first uplink address allocated to the base station and a second uplink address allocated to the target secondary base station, from the SMF network element; and
- before the handover process is completed, sending the second uplink address to the target secondary base station for the target secondary base station to establish a data transmission tunnel with a user plane function (UPF) network element, wherein the data transmission tunnel is used for transmitting the PDU session.

7. The base station of claim 6, wherein the first processor is further configured to implement steps of sending the first downlink address to the SMF network element through an access mobility function (AMF) network element in the core network, and acquiring from the SMF network element through the AMF network element the first uplink address and the second uplink address.

8. The base station of claim 7, wherein the first processor is further configured to implement steps of forwarding the second uplink address to the target secondary base station for the target secondary base station to establish, according to the received second uplink address and the first downlink address allocated to the PDU session by the target secondary base station, the data transmission tunnel with the UPF network element.

9. The base station of claim 6, wherein the first processor is further configured to implement steps of forwarding the second uplink address to the target secondary base station for the target secondary base station to establish, according to the received second uplink address and the first downlink address allocated to the PDU session by the target secondary base station, the data transmission tunnel with the UPF network element.

10. A session management function (SMF) network element, comprising a second processor, a second memory and a second communication bus; wherein
the second communication bus is configured to implement connection and communication between the second processor and the second memory; and
the second processor is configured to execute one or more second programs stored in the second memory to implement steps of:
- in a handover process of a terminal from a source base station side to a target base station side, receiving a first downlink address and a second downlink address sent from a target master base station, wherein the first downlink address is allocated to a protocol data unit (PDU) session by a target secondary base station and the second downlink address is allocated by the target master base station, wherein the PDU session is determined to be split by the target master base station;
- allocating a first uplink address allocated to the target master base station and a second uplink address allocated to the target secondary base station; and
- before the handover process is completed, forwarding the second uplink address to the target base station side.

* * * * *